(12) United States Patent
Bradley

(10) Patent No.: US 8,734,650 B2
(45) Date of Patent: May 27, 2014

(54) METHOD FOR RECOVERING GAS FROM SHALE RESERVOIRS AND PURIFYING RESULTING PRODUCED WATER TO ALLOW THE PRODUCED WATER TO BE USED AS DRILLING OR FRAC WATER, OR DISCHARGED TO THE ENVIRONMENT

(75) Inventor: Robert Bradley, Montgomery, TX (US)

(73) Assignee: Veolia Water Solutions & Technologies North America, Inc., Moon Township, PA (US)

( * ) Notice: Subject to any disclaimer, the term of this patent is extended or adjusted under 35 U.S.C. 154(b) by 690 days.

(21) Appl. No.: 12/957,752

(22) Filed: Dec. 1, 2010

(65) Prior Publication Data
US 2012/0137883 A1    Jun. 7, 2012

(51) Int. Cl.
| | | |
|---|---|---|
| C02F 1/44 | (2006.01) | |
| C02F 9/00 | (2006.01) | |
| C02F 1/24 | (2006.01) | |
| C02F 1/28 | (2006.01) | |
| C02F 1/40 | (2006.01) | |
| C02F 1/66 | (2006.01) | |
| C02F 3/12 | (2006.01) | |
| C02F 5/08 | (2006.01) | |
| C02F 1/20 | (2006.01) | |
| C02F 1/26 | (2006.01) | |
| C02F 1/52 | (2006.01) | |

(52) U.S. Cl.
CPC . *C02F 9/00* (2013.01); *C02F 1/441* (2013.01); *C02F 1/24* (2013.01); *C02F 1/285* (2013.01); *C02F 1/40* (2013.01); *C02F 1/66* (2013.01); *C02F 3/1268* (2013.01); *C02F 5/083* (2013.01); *C02F 1/20* (2013.01); *C02F 1/26* (2013.01); *C02F 1/52* (2013.01); *C02F 1/5245* (2013.01); *C02F 3/1273* (2013.01); *C02F 5/08* (2013.01)
USPC ........... 210/652; 210/704; 210/705; 210/631; 210/749; 210/696; 210/691; 210/692

(58) Field of Classification Search
None
See application file for complete search history.

(56) References Cited

U.S. PATENT DOCUMENTS 5,486,294 A * 1/1996 Brown .......................... 210/674
7,527,736 B2   5/2009 Shafer et al.
(Continued)

FOREIGN PATENT DOCUMENTS

CN    101330952 A    12/2008
CN    101690937 A    4/2010

OTHER PUBLICATIONS

Meijer, D. Th, and M. P. P. Akzo Nobel. "Field-proven removal of dissolved and dispersed hydrocarbons at commercial scale from offshore produced water by the macro porous polymer-extraction technology." Produced water workshop, Aberdeen, Scotland. 2003.*

(Continued)

*Primary Examiner* — Lore Jarrett
*Assistant Examiner* — Benjamin J Behrendt
(74) *Attorney, Agent, or Firm* — Coats and Bennett PLLC

(57) ABSTRACT

A system and method for removing gas from a gas producing subterranean formation and removing contaminants from the produced water is provided. The method includes providing a mixture of gas and water gathered from a gas producing well. Thereafter the method entails separating the gas from the mixture to produce a gas product and the produced water which includes organics, suspended solids and dissolved solids including silica. Thereafter, suspended solids are removed from the produced water. After removing some of the suspended solids, the produced water is directed to a micro porous polymer extraction (MPPE) unit. In the MPPE unit aromatic organic compounds are removed from the produced water. Thereafter the produced water is treated in a membrane bioreactor to remove additional organics. Thereafter the produced water is directed to at least one RO unit that produces a high dissolved solids containing reject stream and a low dissolved solids permeate stream. The method or process described reduces the concentration of certain contaminants in the produced water such that the output or permeate stream from at least one RO unit can be used for frac fluid, drilling mud, or discharged to the environment.

25 Claims, 1 Drawing Sheet

(56) References Cited

U.S. PATENT DOCUMENTS

| | | |
|---|---|---|
| 8,277,547 B2 | 10/2012 | Folkvang |
| 2003/0091467 A1* | 5/2003 | Kmec et al. ............... 422/17 |
| 2004/0112836 A1 | 6/2004 | Manz et al. |
| 2004/0245175 A1* | 12/2004 | Godec et al. ............. 210/639 |
| 2007/0056913 A1* | 3/2007 | Burt ........................ 210/721 |
| 2008/0009422 A1* | 1/2008 | Patel et al. .............. 507/110 |
| 2008/0058576 A1* | 3/2008 | Shafer et al. ............ 588/300 |
| 2009/0045135 A1 | 2/2009 | Khudenko et al. |
| 2009/0173232 A1* | 7/2009 | Folkvang .................. 96/183 |
| 2009/0173692 A1* | 7/2009 | Laraway et al. .......... 210/638 |
| 2009/0230059 A1 | 9/2009 | McGuire et al. |
| 2010/0125044 A1* | 5/2010 | Keister .................... 507/200 |

OTHER PUBLICATIONS

CN Search Report issued Dec. 16, 2013 in re CN Application No. 201180065184.4 filed Jul. 17, 2013.

\* cited by examiner

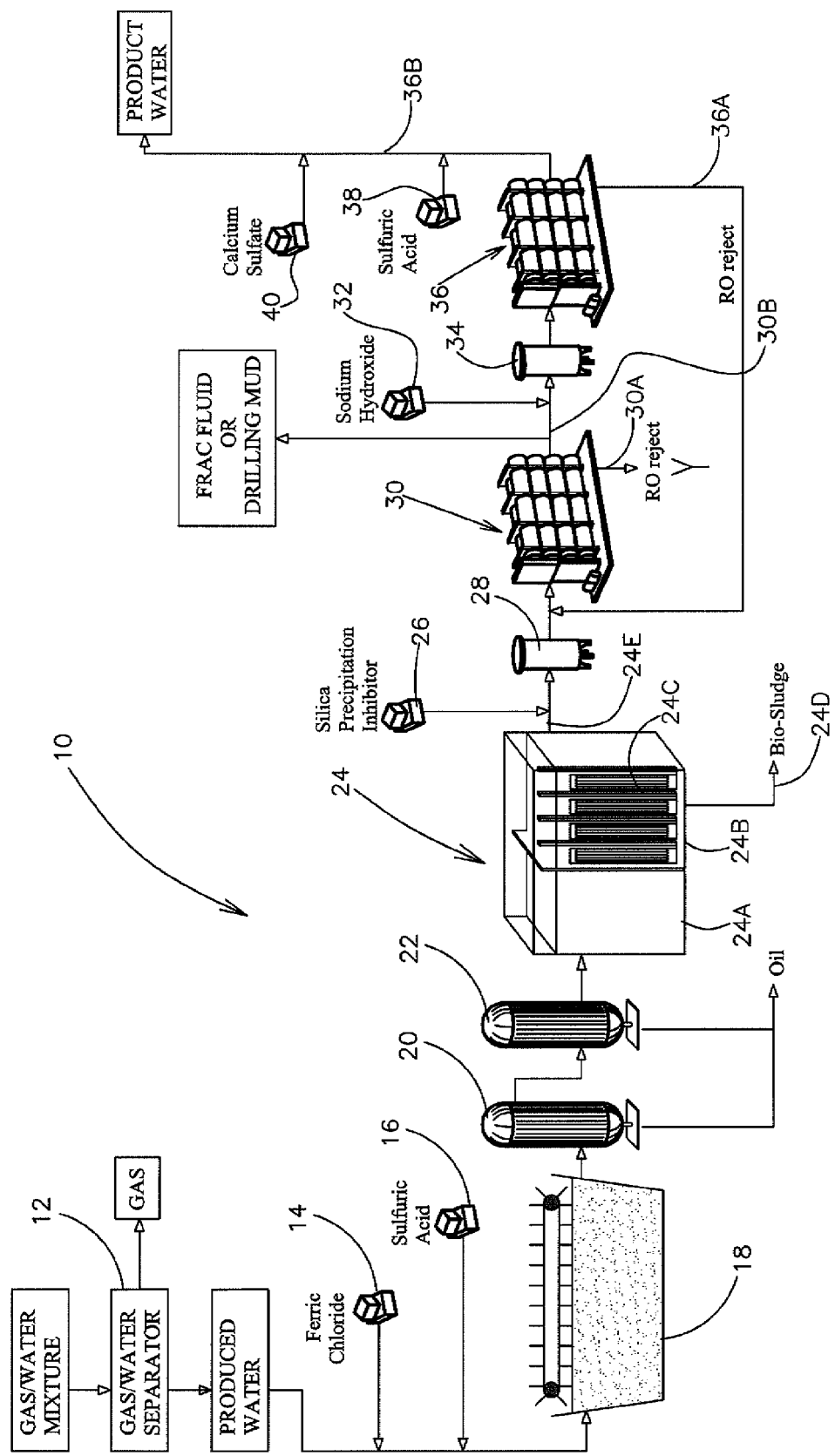

METHOD FOR RECOVERING GAS FROM SHALE RESERVOIRS AND PURIFYING RESULTING PRODUCED WATER TO ALLOW THE PRODUCED WATER TO BE USED AS DRILLING OR FRAC WATER, OR DISCHARGED TO THE ENVIRONMENT

FIELD OF THE INVENTION

The present invention relates to recovering gas or oil from subsurface reservoirs and purifying the resulting produced water.

BACKGROUND OF THE INVENTION

Natural gas is sometimes buried below the Earth's surface in shale reservoirs. To recover this natural gas, the shale reservoirs are hydraulically fractured with large volumes of frac fluid or gel to create a path for the natural gas to flow to the surface. Often, shale reservoirs are associated with ground water. When the natural gas flows to the surface for recovery, the natural water and the water in the frac fluid (sometimes referred to as frac flow back water) flows to the surface as well. The recovered natural water and the water used to frac the shale reservoir, along with oil in some cases, are separated from the natural gas. This water separated from the natural gas is referred to as produced water.

Produced water is often contaminated with concentrations of constituents requiring the produced water to be treated before it can be reused or discharged to the environment. Produced water typically includes natural contaminants that come from the subsurface environment. These contaminants include hydrocarbons from oil and inorganic salts. Produced water may also include manmade contaminants such as drilling mud, frac flow back water that includes spent fracturing fluids, including polymers and inorganic cross-leaking agents, polymer breaking agents, friction reduction chemicals, and artificial lubricants. These manmade contaminants are injected into wells as part of the drilling and production processes and recovered as contaminants in the produced water. In addition, the produced water may include contaminants that result from drilling mud. These contaminants may include acids and caustics such as soda ash, calcium carbonate, sodium hydroxide, and magnesium hydroxide. Furthermore, the contaminants in the produced water may include defoamers, emulsifiers, filtrate reducers, shale control inhibitors, deicers including methanol and other contaminants.

One of the challenges in treating produced water resulting from shale gas production and other natural gas production is to develop a practical and cost effective process that purifies the produced water such that it is suitable for use as frac water, in drilling mud, or which could be discharged to the environment.

SUMMARY OF THE INVENTION

The present invention relates to a method for removing gas from a subterranean reservoir and treating the resulting produced water. Generally the produced water includes organics, suspended solids, dissolved solids and other contaminants. In the present process, in one embodiment, the suspended solids are separated and removed from the produced water. Organics are removed in both a macro porous polymer extraction unit and a membrane bioreactor (MBR). Effluent from the MBR is directed through at least one reverse osmosis (RO) unit and optionally through a second reverse osmosis unit. The first reverse osmosis unit removes contaminants such as dissolved solids from the produced water. Permeate from the first reverse osmosis unit is sufficiently pure that it is suitable for use as frac water or in drilling mud. In some cases the produced water will include a significant boron concentration. The optional second reverse osmosis unit is effective to remove boron and hence the permeate produced by the second reverse osmosis unit is sufficiently pure to be discharged to the environment.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of the system and process of the present invention.

DESCRIPTION OF EXEMPLARY EMBODIMENTS

There are many gas fields in North America and other places in the world that contain substantial quantities of natural gas. This gas is typically trapped in shell formations that require stimulating the well using a process known as fracturing or tracing. A fracing process uses large amounts of water and substantial amounts of particulate fracing material, commonly referred to as frac sands, to enable the extraction of gas from the shell formations. After the well site has been stimulated, the water pumped into the well during the tracing process is removed. The water removed from the well is often referred to as flow back fluid or frac water. A typical fracing process might use a few million gallons of water to fracture the formation of a single well. Since water is an important natural resource that should be conserved whenever possible, should be taken to conserve water by treating the frac water and recycling it.

The present invention is directed to a system and process for recovering shell gas and treating the resulting produced water such that the water can be used as a part of the frac fluid, or used as a drilling mud, or even discharged to the environment.

Before discussing the process in detail, it is beneficial to basically review the components of the system used in removing gas and treating the resulting produced water. Shown in FIG. 1 is a schematic illustration of the gas recovery and produced water purification system of the present invention. The process and system shown therein is indicated generally by the numeral 10.

First the system and process 10 includes a gas-water separation unit 12. Gas-water separation unit 12 is a conventional subsystem that receives a gas-water mixture from the producing well and separates the mixture into gas and produced water. The resulting gas is collected by conventional means. This leaves the produced water to be treated so as to remove certain contaminants to a concentration level that permits the produced water to be used as frac water, drilling mud, or even discharged to the environment.

As seen in FIG. 1, the system and process includes numerous chemical injection sites for injecting selected chemicals into the system for treating the produced water. Downstream from the gas-water separation unit 12 is a coagulant injection site 14 and an acid injection site 16. Various coagulants and acids can be used, but in one exemplary embodiment the coagulant selected is ferric chloride and the acid utilized is sulfuric acid.

Downstream from the injection sites 14 and 16 is a solids separator 18. The function of the solids separator 18 is to remove suspended solids including any precipitants that result from upstream chemical treatment. Various types of solids separators can be utilized. In the embodiment shown in FIG. 1, the solids separator 18 is a dissolved air flotation (DAF) unit. Other types of solid separators such as clarifiers, induced gas flotation (IGF) units, flocculation systems and ballasted flocculation systems can be employed to remove suspended solids and precipitants.

Downstream from the solid separator 18 is a pair of macro porous polymer extraction (MPPE) units. One MPPE unit is referred to by the numeral 20 and the other MPPE unit 22 is referred to by the numeral 22. In the exemplary process shown herein, one of the MPPE units is active in treating the produced water while the other MPPE unit assumes an inactive mode. In the inactive mode the MPPE unit assumes a regeneration state.

After the produced water exits the MPPE unit, the produced water is directed to a membrane bioreactor (MBR) 24. MBR 24 includes a treatment tank 24A and a filtration tank 24B. In the filtration tank is a plurality of membranes 24C that in the exemplary embodiment discussed herein are ultrafiltration membranes. Other types of membranes can be used. MBR 24 includes a sludge outlet 24D and an effluent line 24E. Effluent line 24E functions to direct a permeate stream of produced water from the MBR 24.

Downstream from the MBR 24 is another injection site 26 which in this case is utilized to inject a chemical that inhibits the precipitation of silica.

As seen in FIG. 1 the system can include various pumps 28 and 34 that are utilized at various positions in the process to pump the produced water downstream. In particular pump 28 pumps the produced water to a first RO unit indicated generally by the name of 30. RO unit 30 includes a reject line 30A and a permeate line 30B. Treatment of the produced water in the first RO unit or the first RO pass produces a reject stream having a relatively high dissolved solids content that is directed through reject line 30A to an upstream point in the process. Permeate produced in the first RO unit 30 has a relatively low dissolved solids content and is directed out line 30B. As will be discussed subsequently herein, in some cases the permeate produced by the first RO unit 30 is of a quality that enables it to be used as frac fluid, drilling mud or even discharged to the environment. This is illustrated in FIG. 1. There are, however situations where the permeate produced by the first RO unit 30 has not been sufficiently treated in order to permit it to be discharged to the environment. As will be discussed subsequently herein, the presence of significant amounts of boron in the permeate produced by the first RO unit 30 will in many cases prevent the produced water at that point from being discharged to the environment. Hence in this case the produced water exiting the first RO unit 30 must be treated by a second RO unit 36. Here there is an additional injection site 32 disposed between the first RO unit 30 and the second RO unit 36. As will be discussed subsequently herein, injection site 32 enables a caustic such as sodium hydroxide to be injected and mixed with the produced water so as to raise the pH sufficiently to maintain boron in solution. This enables the boron to be rejected by the second RO unit 36 which includes a reject line 36A and a permeate line 36B. In some embodiments, the permeate produced by the second RO unit 36 is further treated. As shown in FIG. 1 there is an injection site 38 for delivering an acid such as sulfuric acid to the purified produced water and another injection site 40 for adding another chemical such as calcium sulfate. The significance of these two chemicals will be discussed subsequently herein.

Typically, the resulting produced water separated from shale gas will contain about 15,000 ppm of dissolved solids, and about 3,000 ppm of organic matter measured as total organic carbon. These concentrations can of course vary. Typically such a well produces 8,000 to 10,000 barrels of produced water which could be used as frac fluid or drilling mud if the alkalinity and chlorides could be substantially reduced. As a general rule, water can be discharged to the environment if the total dissolved solids are reduced to less than 1,000 ppm and substantially all of the organics removed.

In some cases, the produced water is recovered and transferred to holding tanks that might be located remotely from the producing well which yielded the produced water. In many cases, the free oil will be skimmed off in these holding tanks. In cold environments, the produced water is heated to 6° C. typically by a gas-fired heating system. Typically in these cases, heat exchangers are employed downstream to recover heat from the produced water and the recovered heat is used upstream to heat the produced water.

After the produced water is separated from the gas, the process aims to remove free oil and suspended solids. In the exemplary embodiment shown in FIG. 1, an acid such as sulfuric acid and a coagulate such as ferric chloride is added to the produced water at injection sites 14 and 16. Typically the pH of the produced water separated from the gas is 7.0 or higher. Adding the sulfuric acid reduces the pH and in the exemplary process discussed herein, it is contemplated that the pH of the produced water will be reduced to approximately 6.7 or below. The sulfuric acid will also neutralize the alkalinity of the produced water. Specifically, the bicarbonate alkalinity will be converted to carbon dioxide and the carbon dioxide will be stripped off to the atmosphere downstream when the produced water is subjected to aeration. Further, by adding the acid, the buffering capacity of the water is reduced, and in cases where a second RO pass is required, it follows that a less amount of caustic is required to sufficiently raise the pH to approximately 10 or above to improve boron rejection in the second RO unit 36.

In addition to adding the acid, a coagulate such as ferric chloride is added. The coagulate tends to destabilize suspended solids, free oil, and weak organic acids.

After the acid and coagulate are added by injection sites 14 and 16, the produced water is directed to a solids separator. In the example shown herein, the solids separator is a DAF unit 18. It is appreciated that other types of solids separator could be used. In some cases the produced water will include barium and strontium. These chemicals are foulants and will tend to foul the membranes utilized in the downstream RO units 30, 36. Because sulfuric acid was added to the produced water, barium and strontium precipitate as sulfates and are removed in the DAF unit. In some cases, aluminum is present in the produced water. Aluminum will precipitate as a hydroxide. Thus, in the DAF unit, free oil, weak organic acids, suspended solids, barium, strontium, and aluminum will be removed at least to some extent.

After the free oil, some organic acids, suspended solids and other precipitants are removed, the effluent from the DAF unit is directed to a macro porous polymer extraction (MPPE) unit. As discussed above, in the process shown in FIG. 1, there are two MPPE units 20 and 22. One is operated in an active state while the other generally assumes a regeneration or ready state. Details of the MPPE unit are not dealt with herein because such is not per se material to the present invention, and further, MPPE units are known and are commercially available. The MPPE unit will remove aromatic and poly aromatic organics from the produced water. As used herein, the term "aromatic organics" includes all forms of aromatic organics including poly aromatic organics. The MPPE units 20, 22 are liquid extraction devices. Each MPPE unit includes a column having an array of beads that comprise a polymer that encases or holds an extraction fluid. As the produced water passes over the beads, the extraction fluid extracts organics, particularly aromatic organics, from the produced water. The MPPE unit is effective to reduce the concentration of total organic carbon (TOC). Generally the MPPE unit will not remove all organics, but is effective to remove some. Remaining organics in the produced water can be biologically digested by the MBR 24. However, some organic compounds are biotoxic or refractory to biological treatment. One of the purposes of the MPPE unit is to remove these toxic organic compounds from the produced water before they reach the MBR 24 where they can have an adverse impact on the biomass that is responsible for treating the produced water in the MBR.

As noted above, in a typical example, one of the MPPE units 20 or 22 is removed from service in order that the polymer beads can be rejuvenated. This occurs when the extraction fluid in one of the MPPE units becomes saturated with organics. One process for rejuvenating the polymer beads is to use steam produced by a small electric steam generator to strip the media. The steam will remove the organics from the extraction fluid to form a steam-organics mixture. Thereafter, the steam-organics mixture can be condensed and the organics separated from the condensed water which can be recycled to a point upstream in the process.

After the water is treated in one of the MPPE units, the produced water is directed to the MBR. Organic compounds remaining in the produced water are oxidized by aerobic bacteria and converted to carbon dioxide. Weak organic acids that can foul the RO membranes will also be reduced. Oxygen in the MBR will also oxidize iron in the produced water and will cause the iron to precipitate as hydroxide. Bacteria and precipitated iron will be filtered out in the filtration tank 24B and the resulting sludge will be directed from the MBR via the sludge outlet line 24D. One of the principal RO foulants is high molecular weight organic acids. These are weak acids that do not ionize well and have a limited solubility in water. Typically, if these high molecular weight organic acids are not removed from the produced water prior to reaching the RO units, the RO membranes will reject the organic acids and they will become so concentrated that the organic acids precipitate onto the membrane, and as a result, foul the membranes. In the MBR unit, bacteria will consume these acids and prevent downstream fouling from occurring due to these high molecular weight organic acids. Also, in many cases the produced water has a substantial amount of methanol. RO membranes do not typically remove methanol. In the MBR 24, bacteria consume the methanol and generally prevent the methanol from reaching the RO units.

The effluent, or water treated by the MBR, is then directed to an RO system. In the exemplary embodiment shown in FIG. 1, the RO system comprises a two pass system, including RO unit 30 and RO unit 36. Because of the high total dissolved solids in the produced water, the first pass in some exemplary embodiments can benefit from a two stage arrangement. In the first stage of the first RO unit 30, the membranes may be what is sometimes referred to as brackish water membranes. In a typical process, the first stage of the first RO unit 30 will convert about half of the produced water to product water. In one example, the first stage can be operated at approximately 450 psig. The reject from the first stage will then be directed to a booster pump which will increase the feed pressure to the second stage to approximately 800 psig or above. The second stage can be equipped with what is sometimes referred to as seawater membranes. In the end, the first pass RO unit 30 will operate at approximately 75% recovery. The product water from the first pass or from the first RO unit 30 is generally of a sufficient quality to be used for frac water or drilling mud. In some cases, the product water of the first RO unit 30 does not include any significant amount of boron, and in those cases the product water from the first RO unit can be discharged to the environment. In some cases, however, the product water from the first RO unit 30 will include a boron concentration of about 4 ppm and higher. In that case it will be necessary in most situations to remove the boron, or substantially all of the boron before the product water can be discharged to the environment.

The pH of the produced water plays an important part on the passage of many ions through an RO membrane. Some ions such as ammonia are removed better at low pH. Others are more efficiently removed at high pH. Boron, which is present in many produced waters, is not removed efficiently at low pH. The concern with raising the pH prior to the first RO unit 30 is that the produced water at that stage includes a significant concentration of calcium carbonate ($CaCO_3$) which would scale the membranes of the first RO unit 30. Since substantially all (generally equal to or greater than 99%) of the calcium carbonate is removed by the first RO unit, the pH of the permeate to the second RO unit can be raised without a significant risk of fouling due to the calcium carbonate. To remove the boron, the pH of the feed to the second RO unit 36 is increased to approximately 10 or higher. Because the buffering of the produced water has been nearly eliminated at this point in the process, it will usually take a relatively small amount of caustic to raise the pH. Since the total dissolved solids of the feedwater to the second RO unit 36 is low, the second pass or the second RO unit will operate in a typical exemplary process at a little over 200 psig with an expected 90% recovery. To conserve water and minimize waste, the reject water from the second RO unit 36 is returned to the first RO unit. It is contemplated that in an exemplary process, that the overall recovery of both RO systems taken together will be approximately 73% or higher.

It is appreciated that one of the main concerns in designing RO systems is to provide a process design that eliminates or minimizes RO membrane fouling. The present system and process is designed to eliminate, or at least minimize, membrane fouling of the RO units 30 and 36. Generally, the organics are removed by the DAF, MPPE, and MBR units. Scaling potential due to calcium carbonate is substantially reduced by the addition of the sulfuric acid and can be further controlled by an anti-scalant feed. Iron and aluminum have also been removed upstream from the RO units 30 and 36. This leaves as the major concern, silica. The solubility of silica is about 120 ppm in neutral water. The produced water generally has as much as 70 ppm of silica. At 75% recovery the silica can concentrate up to about 280 ppm. That is more than double saturation. The present invention contemplates adding a silica precipitation inhibitor via injection site 26 to the produced water upstream of the first RO unit 30. Various silica inhibitors can be utilized. One example is a commercial silica precipitation inhibitor known by "Hydrex 4109". Such silica precipitation inhibitors will generally prevent silica, calcium carbonate, barium sulfate, and a number of other precipitants from forming. However, such chemicals are not generally effective with respect to iron or aluminum. As noted above, removal of aluminum and iron is addressed by the DAF unit and the MBR unit. Generally it has been found that if the produced water is free of iron and aluminum that a silica precipitation inhibitor can maintain silica in solution up to over 300 ppm.

It is appreciated that the makeup or chemical composition of the produced water can vary from location to location. Further, the reduction in concentration of certain constituents can vary from process to process depending on the makeup of the produced water, reagents added, quantity of reagents added, and the effectiveness of various processes utilized. Table 1 appearing below is one example of a produced water stream treated by the method described above. Table 1 shows the makeup or chemical composition of the produced water which includes the contaminants or impurities of interest. Table 1 also indicates the concentrations of these various contaminants or impurities throughout the process.

TABLE 1

Exemplary Analysis for Chemical Makeup of Produced Water & Various Treated Effluent

|  | Produced Water mg/L as ion | Produced Water mg/L as $CaCO_3$ | DAF Effluent mg/L as $CaCO_3$ | MPPE Effluent mg/L as $CaCO_3$ | MBR Effluent mg/L as $CaCO_3$ | RO Product mg/L as ion | pH Adjusted Effluent mg/L as ion |
|---|---|---|---|---|---|---|---|
| Ca | 46 | 115 | 115 | 115 | 115 |  | 1 |
| Mg | 13 | 54 | 54 | 54 | 54 |  |  |
| Na (to balance) | 5,120 | 11,382 | 11382 | 11382 | 11,382 | 0.16 | 0.16 |
| K | 64 | 82 | 82 | 82 | 82 |  |  |
| Sr | 2 | 2.8 | 2 | 2 | 2 |  |  |
| Ba | 14 | 10.2 | 2 | 2 | 2 |  |  |
| Total CATIONS |  | 11,646 | 11,637 | 11,637 | 11,637 |  |  |
| $HCO_3$ | 3,665 | 3,005 | 36 | 36 | 36 | 0.01 | 0.01 |
| $CO_3$ |  |  |  |  |  |  |  |
| OH |  |  |  |  |  |  |  |
| Cl | 6,100 | 8,601 | 8,601 | 8,601 | 8,601 | 0.12 | 0.12 |
| $SO_4$ | 38 | 40 | 3,000 | 3,000 | 3,000 | 0.02 | 1.03 |
| $PO_4$ |  |  |  |  |  |  |  |
| $NO_3$ |  |  |  |  |  |  |  |
| F |  |  |  |  |  |  |  |
| Total ANIONS |  | 11,646 | 11,637 | 11,646 | 11,637 |  |  |
| Total Hardness | 169 | 169 | 169 | 169 | 169 |  |  |
| MO Alkalinity | 3005 | 3005 | 36 | 36 | 36 |  |  |
| P Alkalinity |  |  |  |  |  |  |  |
| $CO_2$ | 120 | 1 | 10 | 10 | 14 |  |  |
| $SiO_2$ | 48 | 48 | 48 | 48 | 48 |  |  |
| FOG | 18 | 18 | 5 |  |  |  |  |
| TSS | 18 | 18 | 5 |  |  |  |  |
| TDS (ion) | 15,226 | 15,226 | 14,435 | 14,435 | 14,435 | 3 | 3 |
| pH | 7.75 | 7.75 | 6.70 | 6.70 | 6.70 | 9.1 | 8 |
| $pH_s$ | 7.00 | 7.00 | 8.87 | 8.87 | 8.87 |  |  |
| Fe | 7.3 | 7.3 | 0.1 | 0.1 | <0.1 |  |  |
| Mn |  |  |  |  |  |  |  |
| B | 14.23 | 14.23 | 14.23 | 14.23 | 14.23 | 0.4 | 0.4 |
| COD | 13,480 | 13,480 | 13,000 | 11,200 | 100 |  |  |
| TOC | 3,370 | 3,370 | 3,371 | 2,800 | 25 |  |  |
| LSI | 0.75 | 0.75 | −2.17 | −2.17 | −2.17 |  |  |
| RSI | 6.26 | 6.26 | 11.04 | 11.04 | 11.04 |  |  |
| Temperature, °C. | 3 | 3 | 6 | 6 | 6 | 6 | 6 |
| SAR |  |  |  |  |  |  | 0.031 |
| Flow Rates (gpm) | 292 | 292 | 292 | 292 | 292 | 213 | 213 |
| Flow Rates (bls/day) | 10,000 | 10,000 | 10,000 | 10,000 | 10,000 | 7,300 | 7,300 |

Chemicals and Power Requirements

| | |
|---|---|
| Sulfuric acid | 23 lbs/1000 gals. |
| MBR Power | 1008 kWh/day |
| Hydrex 4109 | 0.025 kWh/day |
| Caustic to Second Pass | 0.14 lbs/1000 gals. |
| RO Power | 3164 kWh/day |
| Calcium Sulfate SAR Adjust | 0.008 lbs/1000 gals. |
| Sulfuric acid Effluent | 0.0001 lbs/1000 gals. |

It is contemplated that the process shown in FIG. 1 and described above will produce a product water from the second pass RO unit 36 that contains 3 ppm or less of total dissolved solids and 0.5 ppm or less of boron. Typically the pH of the product water will be adjusted with a relatively small amount of sulfuric acid and a small amount of calcium sulfate. The calcium sulfate is typically added to increase the sodium absorption ratio to greater than about 6.

As discussed above, the permeate produced by the first RO unit 30 is typically of a quality that enables it to be used as a constituent of frac fluid or drilling mud. That is the permeate produced by the first RO unit 30 is of a sufficient quality that it can be used as frac fluid or drilling mud without having to undergo treatment in the second RO unit 36.

Table B appearing below shows exemplary requirements for frac water and drilling mud.

TABLE 2

Exemplary Requirements for Frac Water and Drilling Mud

| Contaminant | Drilling Mud | Frac Water |
|---|---|---|
| Ca |  | <2000 |
| Mg |  |  |
| Iron | <300 | <5 |
| Total Hardness | <200 |  |
| Cl | <2000 | <40,000 |
| $SO_4$ | <1500 | <500 |
| $HCO_3$ |  | <600 |
| $CO_3$ |  |  |
| Total Alk. | <1000 |  |
| pH | 7.0-8.5 |  |

It follows that the produced water recovered from a producing well can be treated with the present process to produce product water that can be combined with conventional constituents to make up frac fluid or drilling mud and the resulting frac fluid or drilling mud can then be used in connection with other wells in the vicinity. That is, the resulting frac fluid can be utilized to fracture shell formations and the drilling mud can be utilized in drilling operations. It also follows that the product water produced by this process can be containerized and transported to other sites for use in frac fluid and drilling mud. As pointed out above, if the produced water includes a significant amount of boron, in most cases it will be necessary to remove the boron through the second pass RO system. In any event, if the boron concentration is 0.5 ppm or less then the treated produced water can be discharged to the environment.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A method of removing gas from a gas producing subterranean formation and removing contaminants from resulting produced water, comprising:

providing a mixture of gas and water gathered from the gas producing subterranean formation;

separating the gas from the mixture to produce a gas product and the produced water which contains contaminants including organics, suspended solids, and dissolved solids including silica;

removing suspended solids from the produced water;

after removing at least some suspended solids from the produced water, directing the produced water to a macro porous polymer extraction (MPPE) unit;

treating the produced water in the MPPE unit by removing aromatic organic compounds from the produced water including directing the produced water over polymer beads having an extraction fluid disposed therein and causing aromatic organic compounds in the produced water to pass through the polymer beads where the aromatic organic compounds are dissolved in the extraction fluid in the beads;

after treating the produced water in the MPPE unit, directing the produced water to a membrane bioreactor (MBR);

treating the produced water in the MBR to remove additional organics;

mixing a silica precipitation inhibiting agent with the produced water;

after the silica precipitation inhibiting agent has been mixed with the produced water, directing the produced water to at least one reverse osmosis (RO) unit and producing a high dissolved solids containing reject stream and a low dissolved solids permeate stream; and sufficiently removing contaminants from the produced water such that the permeate stream is suitable for:
1. use in a frac fluid;
2. use in drilling mud; or
3. discharge to the environment.

2. The method of claim 1 including removing substantial bicarbonate alkalinity from the produced water before the produced water is treated in the MPPE unit.

3. The method of claim 1 wherein the produced water further includes barium and strontium, and wherein the method includes after separating the produced water from the gas, lowering the pH of the produced water, adding a sulfate to the produced water, and precipitating barium and strontium as sulfates.

4. The method of claim 1 wherein a separation unit is disposed upstream of the MPPE unit and functions to remove free oil and suspended solids from the produced water, and wherein the separation unit includes a dissolved air flotation unit, an induced gas flotation unit, a clarifier, or a ballasted flocculation system.

5. The method of claim 1 including mixing at least a part of the permeate stream with frac constituents to form a frac fluid, and discharging the frac fluid under pressure into a non-gas producing subterranean formation.

6. The method of claim 1 including mixing sulfuric acid with the produced water and precipitating dissolved metals in the produced water as sulfates.

7. The method of claim 1 wherein the produced water includes boron and wherein the produced water is treated by first and second RO units and wherein the permeate stream includes a first permeate stream produced by the first RO unit and a second permeate stream produced by the second RO unit; and wherein the method includes raising the pH of the first permeate stream to 10 or higher and directing the first permeate stream into the second RO unit and wherein the second RO unit is effective to remove boron such that the second permeate stream includes a boron concentration of 0.5 ppm or less.

8. The method of claim 1 wherein at least some of the organics in the produced water are biotoxic, and the method includes removing at least some of the biotoxic organics in the MPPE unit and generally reducing the concentration of biotoxic organics in the produced water prior to the produced water reaching the MBR.

9. The method of claim 1 including mixing at least a part of the permeate stream with drilling mud constituents to form drilling mud, and discharging the drilling mud into a non-gas producing subterranean formation.

10. The method of claim 1 wherein the produced water separated from the gas has a pH of 7.0 or higher, and wherein the method includes adding an acid to the produced water and lowering the pH to approximately 6.7 or lower and precipitating metal containing compounds from the produced water.

11. The method of claim 10 including mixing a coagulant with the produced water and causing some organic acids to coagulate, and removing coagulated organic acids from the wastewater.

12. The method of claim 11 wherein the acid is sulphuric acid and the produced water includes barium and wherein the method includes precipitating barium sulfate from the produced water.

13. The method of claim 1 wherein the macro porous polymer extraction unit includes a plurality of polymer beads, each having an extraction fluid disposed therein, where the method further comprises directing the produced water over the polymer beads such that the aromatic organic compounds in the produced water pass through the polymer beads and are dissolved in the extraction fluid.

14. The method of claim 1 comprising adding a silica precipitation inhibitor to the produced water prior to the produced water being directed to the reverse osmosis unit such that the silica in the produced water remains in solution as the produced water passes through the reverse osmosis unit.

15. The method of claim 1 wherein the produced water includes iron, chlorine, sulfate and bicarbonate, and wherein the permeate stream includes less than 5 mg/l of iron, less than 500 mg/l of sulfate and less than 600 mg/l of bicarbonate.

16. The method of claim 1 wherein the produced water includes iron, hardness, chlorine, sulfate, bicarbonate, and wherein the permeate stream includes less than 5 mg/l of iron, less than 200 mg/l of hardness, less than 2,000 mg/l chlorine, less than 500 mg/l of sulfate, less than 600 mg/l bicarbonate, and wherein the permeate stream includes a total alkalinity of less than 1,000 mg/l.

17. The method of claim 7 further comprising:
removing calcium carbonate from the produced water in the first RO unit such that the first permeate stream contains substantially less calcium carbonate than a first retentate stream produced by the first RO unit;
increasing the pH of the first permeate stream prior to directing the first permeate stream through the second RO unit; and
removing boron from the first permeate stream in the second RO units.

18. A method of removing gas from a subterranean formation containing gas and treating resulting produced water, comprising:
providing a mixture of gas and water gathered from the subterranean formation;
separating gas from the mixture to produce a gas product and the produced water containing contaminants including organics, suspended solids and dissolved solids;
removing suspended solids from the produced water;
directing the produced water to a macro porous polymer extraction (MPPE) unit utilizing the MPPE unit to remove at least some organics from the produced water;
after treating the produced water in the MPPE unit, directing the produced water to a membrane bioreactor (MBR);
removing at least some organics in the MBR and producing sludge and an MBR effluent;
directing the MBR effluent to a first RO unit and removing dissolved solids from the MBR effluent by producing a high dissolved solids containing reject stream and a low dissolved solids containing permeate stream;
mixing at least a portion of the permeate stream with fracturing constituents to form a fracturing fluid or mixing the permeate stream with drilling mud constituents to form a drilling mud; and
directing the fracturing fluid or the drilling mud into a subterranean area.

19. The method of claim 18 wherein the produced water includes calcium, iron, chlorine, sulfate and bicarbonate, and wherein the method reduces the concentration of calcium to less than 2000 mg/l, the iron concentration to less than 5 mg/l, the chlorine concentration to less than 40,000 mg/l, the sulfate concentration to less than 500 mg/l, and the bicarbonate concentration to less than 600 mg/l.

20. The method of claim 18 wherein the produced water includes iron, hardness, chlorine, sulfate, and alkalinity, and wherein the method reduces the concentration of iron to less than 300 mg/l, the hardness concentration to less than 200 mg/l, the chlorine concentration to less than 2,000 mg/l, the sulfate concentration to less than 1500 mg/l, and total alkalinity to less than 1,000 mg/l as $CaCO_3$.

21. The method of claim 18 wherein the produced water includes a boron concentration greater than 0.5 ppm and wherein the method includes a two pass RO system including a first RO unit and a second RO unit and wherein the permeate from the first RO unit is directed to the second RO unit and wherein the pH of the permeate produced by the first RO unit is raised to 10 or more and thereafter directed to the second RO unit which is effective to remove boron to 0.5 ppm or lower.

22. A method of treating produced water resulting from the recovery of gas from a gas producing well, and wherein the treatment of the produced water is such that the treated produced water is suitable for use as frac water or suitable for use in drilling mud, the method comprising:
providing produced water taken from a gas producing well where the produced water contains contaminants including organics, suspended solids, and dissolved solids including silica;
removing suspended solids from the produced water;
after removing suspended solids from the produced water, directing the water to a macro porous polymer extraction (MPPE) unit;
treating the produced water in the MPPE unit by removing aromatic organic compounds from the produced water;
after treating the produced water in the MPPE unit, directing the produced water to a membrane bioreactor (MBR);
treating the produced water in the MBR to remove additional organics;
mixing a reagent with the produced water where the reagent acts to maintain substantial amounts of silica in solution;
after the reagent has been mixed with the produced water to maintain silica in solution, directing the produced water to at least one RO unit and producing a high dissolved solids containing reject stream and a low dissolved solids permeate stream; and sufficiently removing contaminants from the produced water such that the permeate stream is suitable for use as frac water, or suitable for use in drilling mud.

23. The method of claim 22 wherein the produced water includes the following contaminants: calcium, iron, hardness, chlorine, sulfate, bicarbonate, and alkalinity, and wherein the method removes substantial amounts of the contaminants from the produced water such that the permeate stream includes less than: 2,000 mg/l calcium, 5 mg/l of iron, 200 mg/l of hardness, 2,000 mg/l of chlorine, 500 mg/l sulfate, 600 mg/l bicarbonate, and 1,000 mg/l of total alkalinity or $CaCO_3$.

24. The method of claim 22 wherein the produced water includes the following contaminants: calcium, iron, chlorine, sulfate, and bicarbonate; and wherein the method removes substantial amounts of the contaminants from the produced water such that the permeate stream includes less than: 2,000 mg/l of calcium, 5 mg/l of iron, 40,000 mg/l of chlorine, 500 mg/l of sulfate, and 600 mg/l of bicarbonate.

25. The method of claim 22 wherein the produced water includes the following contaminants: iron, hardness, chlorine, sulfate, and total alkalinity; and
wherein the method removes substantial amounts of the contaminants from the produced water such that the permeate stream includes less than: 300 mg/l of iron, 200 mg/l of hardness, 2,000 mg/l of chlorine, 1,500 mg/l of sulfate, and 1,000 mg/l of total alkalinity or $CaCO_3$.

* * * * *